United States Patent [19]

Bhide'

[11] 4,292,992
[45] Oct. 6, 1981

[54] VALVE FOR HANDLING SOLIDS CAPABLE OF GAS-PRESSURE-TIGHT CLOSURE AGAINST A GAS PRESSURE DIFFERENTIAL

[75] Inventor: Yeshwant K. Bhide', New Berlin, Wis.

[73] Assignee: Allis-Chalmers Corporation, Milwaukee, Wis.

[21] Appl. No.: 59,966

[22] Filed: Jul. 23, 1979

[51] Int. Cl.³ .................... F16K 49/00; F16K 25/00
[52] U.S. Cl. .................................. 137/340; 137/240; 137/375; 251/172; 137/613
[58] Field of Search ............... 137/240, 340, 375; 251/329, 172, 195, 196

[56] References Cited

U.S. PATENT DOCUMENTS

| | | | |
|---|---|---|---|
| 1,995,727 | 3/1935 | Wetherbee | 137/375 |
| 2,331,465 | 10/1943 | Fox | 137/340 |
| 2,705,016 | 3/1955 | Saar | 137/340 |
| 3,044,741 | 7/1962 | Grove | 251/172 |
| 3,266,517 | 8/1966 | Carr | 137/340 |
| 3,367,625 | 2/1968 | Fortune | 251/195 |
| 3,487,849 | 1/1970 | Vietorisz | 137/340 |
| 3,929,316 | 12/1975 | Guthrie | 251/196 |
| 4,136,710 | 1/1979 | Bonl | 137/375 |
| 4,157,169 | 6/1979 | Norman | 251/62 |

Primary Examiner—A. Michael Chambers
Attorney, Agent, or Firm—Robert C. Jones

[57] ABSTRACT

The valve of the present invention includes an inflatable seal element located in the housing seat and a gas-pressure-purge arrangement. The inflatable seal element is inflated by means of pressurized fluid to grow in size and close up clearances between gate and seat, thereby establishing a gas-tight seal between the two parts, at will. So this can be done, for example, after the valve has been operated to close (slide gate driven into the valve housing) and a gas-pressure-tight seal is desired. Prior to this event, the gas-pressure-purge arrangement is activated to blast-off solid particles from the gate surfaces where these make contact with the inflatable seal element. It is not mandatory that each and every solid particle be removed from the gate contact surfaces by means of the gas-pressure-purge arrangement. Only a reasonable amount of cleanliness on the gate contact surfaces is desirable. The inflatable seal element is capable of sealing gas-tight even when some solid particles become trapped and embedded on the inflatable seal surface. The purpose of the gas-pressure-purge arrangement is to keep the contact surfaces reasonably free of solid particles only to improve the life of the inflatable seal element. Furthermore, the inflatable seal element can be deflated to shrink in size, thereby providing increased clearance between gate and seat, when desired. So this is done just prior to the moment when the gate is to be operated (driven out of the housing) to open the valve. No scoring can occur on gate or seat on account of the increased clearance.

3 Claims, 8 Drawing Figures

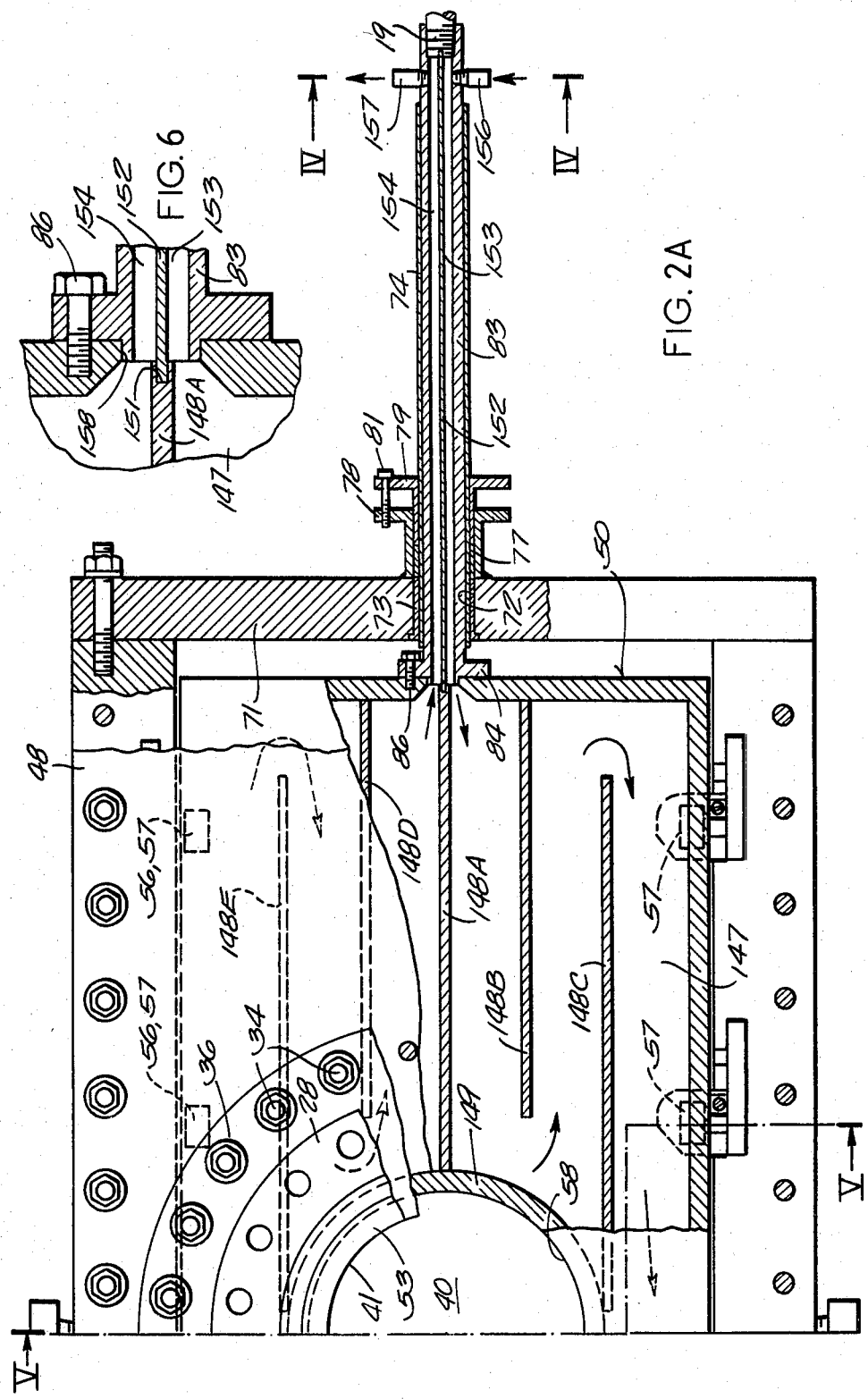

VALVE FOR HANDLING SOLIDS CAPABLE OF GAS-PRESSURE-TIGHT CLOSURE AGAINST A GAS PRESSURE DIFFERENTIAL

BACKGROUND OF THE INVENTION

Coal gasification processes have one common problem in the injection of coal solids into the high pressure reactor; or the removal of spent solids from the reactor to atmosphere or some form of transportation system. Although the operating principle of a lock hopper system is relatively simple, the operation of the valves associated with such a system is complicated and difficult. The difficulties arise from the requirement of the valves of handling the highly erosive char on discharge side of the coal gasification process, and coal on the feed side of the system. This difficulty exists whether the material being handled is dry or in slurry form. The difficulty becomes more pronounced when the valves are also required to seal against high pressures and/or very hot gas. It is not uncommon in process systems to find pressures of at least 1600 psi and higher, and temperatures which are above 600° F. Reliability of the valves for the severe service and for long-time intervals without failure adds to the complication of difficulties.

At a recent conference sponsored by the Department of Energy (DOE) and the Morgantown Energy Research Center in conjunction with the Valve Manufacturer's Association, the conferees were informed that valves have been tested for the aforementioned type of service and that all present problems and are not entirely adequate for the type of severe service outlined. However, this could be due to the fact that the valves tested might be off-the-shelf type and not conceived for the operation desired.

The lack of a market for valves required for the severe service would generally discourage manufacturers expending monies in doing R&D work. The need for a severe service valve in coal gasification processes and other types of processes which are suitable for handling a three-phase mixture of solids entrained in water and gas is more than evident; it is an urgent requirement.

It is herein proposed to utilize slide gate valves between a surge hopper and a lock hopper and between the lock hopper and atmosphere. Standard slide gate valves normally depend on rigid metal-to-metal contact between the sliding gate and its static seat located in the valve housing, to shut-off against the medium of materials or fluids (solid particles and gas under pressure in this application) passing through the valve. In such valves, clearances must be provided between gate and seat, even if all surfaces are machined to close tolerances, in order to allow the former to slide freely in the latter for opening and closing the valve. It is these very clearances that prevent the valve from being completely gas-tight in the closed position, when a gas pressure differential is applied across the valve. The solid particles only serve to aggravate the situation by getting trapped in between gate and seat, thereby preventing complete closure between their machined surfaces, and in fact cause these surfaces to become scored when the gate is operated to open or close the valve. Attempts to remove the trapped solid particles from the site by means of streams of pressurized gas (hereafter referred to as gas-pressure-purging) cannot be guaranteed to remove all the particles entirely from the site.

The above-described two basic problems exist also with other types (categories) of valves, such as ball valves, butterfly valves and swing-check valves. Again, complete closure between rigid-moving, male-member surfaces and their mating static rigid-seat surfaces is not possible, to provide a completely gas-tight shut-off against a gas pressure differential. Even when one of the aforementioned contact surfaces is not rigid, for example, when seats are made of teflon or other semi-rigid materials, any trapped solid particles remaining (and some will remain even after gas-pressure-purging) can become embedded in the teflon seat and will score both the seat as well as the moving male member when the valve is operated to open or close, due to the close machined tolerances (or clearances) maintained between the two parts.

The novel valve of the present invention includes an inflatable seal element located in the valve housing seat. There is also a gas-pressure-purge arrangement which purges the seat area of abrasive solid particles.

The inflatable seal element can be inflated by means of pressurized gas, to grow in size and close up clearances between gate and seat, thereby establishing a gas-tight seal between the two parts, at will. So this can be done, for example, after the valve has been operated to close (slide gate driven into the valve housing) and a gas-pressure-tight seal is desired. Prior to this event, the gas-pressure-purge arrangement is activated to blast-off solid particles from the gate surfaces where these make contact with the inflatable seal element. It is not mandatory that each and every solid particle be removed from the gate contact surfaces by means of the gas-pressure-purge arrangement. Only a reasonable amount of cleanliness on the gate contact surfaces is desirable. The inflatable seal element is capable of sealing gas-tight even when some solid particles become trapped and embedded on the inflatable seal surface. The purpose of the gas-pressure-purge arrangement is to keep the contact surfaces reasonably free of solid particles only to improve the life of the inflatable seal element.

Furthermore, the inflatable seal element can be deflated to shrink in size, thereby providing increased clearance between gate and seat, when desired. So this is done just prior to the moment when the gate is to be operated (driven out of the housing) to open the valve. No scoring can occur on gate or seat on account of the increased clearance.

SUMMARY OF THE INVENTION

Lock hopper system provides for the removal of spent solids from a pressurized vessel to atmospheric conditions. Such lock hopper systems are normally of two types, one of which is "dry" and involves handling of the spent solids in a dry, hot condition; the other is the "wet" type where the spent solids are quenched by water and handled as a slurry. In either type, the valves 14 and 17 in FIG. 1 will be closed and the lock hopper 16 will be pressurized. When the surge hopper 11 becomes full, valve 14 is opened to drop the spent solids, either dry or wet, into the lock hopper 16. When the solids have dropped out of the surge hopper 11 into the lock hopper 16, valve 14 will be closed. The lock hopper 16 will be depressurized and then valve 14 opened to discharge the spent solids. The valves herein conceived include inflatable seal elements located in the valve housing seat and there is also provided a gas-pressure-purge arrangement. The inflatable seal operates to close up clearances between gate and seat to thereby establish a gas-tight seal.

DESCRIPTION OF THE DRAWING

FIGS. 2 and 2A taken together is a plan view of the valve shown in FIG. 1, with parts broken away to show interior structure;

FIG. 6 is an enlarged view of the connecting arrangement between the actuating rod barrier and the slide gate center barrier depicted in FIG. 2A.

DESCRIPTION OF THE INVENTION

Figure 1:
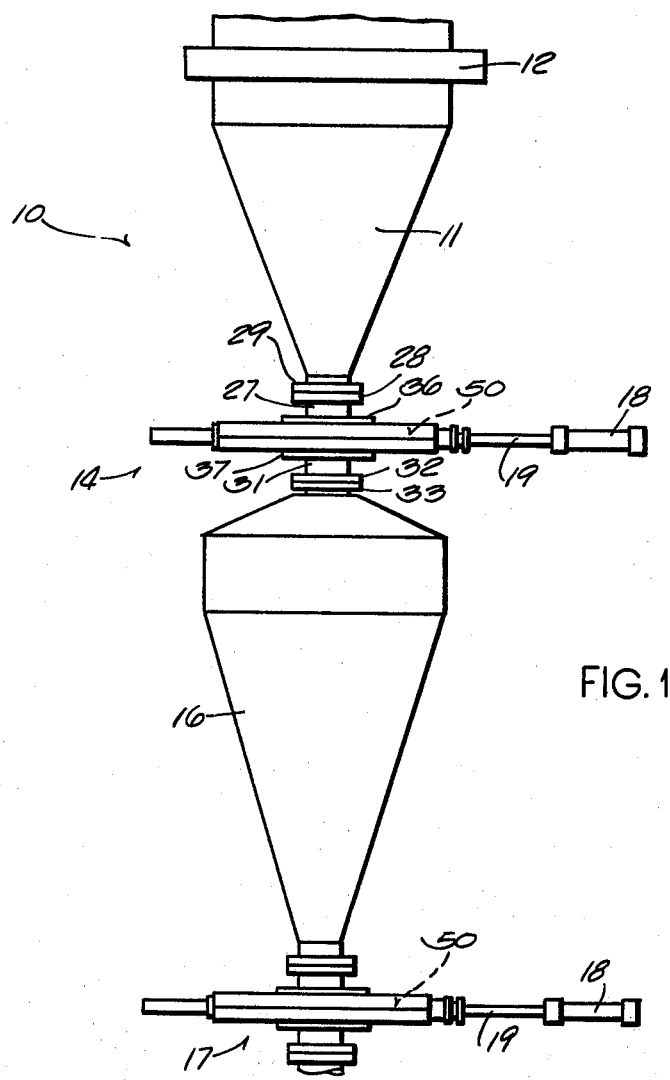
FIG. 1 is a schematic view of a discharge system for handling spent hot solids showing the location of the valves of the present invention.

As shown in FIG. 1, the system 10 with which the valve of the present invention is associated includes a surge hopper 11 in which quench water may be admitted through a manifold 12. The spent solids such as char are deposited in the hopper 11 from a pressurized vessel (not shown). A valve 14 of the present invention interposed between the surge hopper 11 and a lock hopper 16 is closed and, also, the valve 17 is closed. With this condition, the lock hopper 16 is pressurized to at least 120 psi. When the surge hopper 11 is full, the valve 14 is opened by a linear-actuator 18 which herein is shown as a hydraulic cylinder. The cylinder rod 19 extending outwardly of cylinder 18 is mechanically connected to a slide gate 50 to actuate it to a closed position or an open position.

The valve 14 is of multi-piece construction having an upper valve body portion 27 presenting a radial flange 28 for sealing engagement with complementary flange 29 of the outlet of the surge hopper 11. The lower valve body portion 31 of the valve 14 is similar to the upper portion and has a radial flange 32 that mates in sealing relationship with a radial flange 33 provided on the inlet end of the lock hopper 16. The upper and lower body portion 27 and 31 are joined together in sealed relationship with a radial flange 33 provided on the inlet end of the lock hopper 16. The upper and lower body portion 27 and 31 are joined together in sealed relationship by screws 34 and 52, respectively, extending through suitably aligned openings formed in laterally extending flanges 36 and 37 that are integrally formed with the body portion 27 and 31, respectively.

The upper and lower valve body portions 27 and 31 are identical and each are formed with an inner-end portion 35 and 35A, respectively, that include radial extending flanges 36 and 37. Each of the valve body portions have axial openings 39 and 41 respectively, which cooperate to define a flow through passage 40.

The upper and lower valve body portions 27 and 31 are each received in bores 46 and 47 formed in upper and lower identical plate members 48 and 49. Upper and lower plate members 48 and 49 are cooperatively assembled to form a housing for a movable slide gate 50. As shown, the upper-valve body portion 27 is secured in position within the opening 46 by a plurality of screws 34 that extend through the radial flange 36 into threaded engagement with the upper-plate member 48.

In a similar manner, the lower valve body portion 31 is secured in position in the opening 47 of the lower plate 49 by a plurality of screws 52 that extend through the flange 37 into threaded engagement with the plate.

The upper and lower valve body portions 27 and 31 are provided with replaceable cylindrical wear resistant liners 53 and 54, respectively, which serve to protect the interior of valve body portions from the abrasive action of the coal or char particles passing through the valve.

Figure 2:
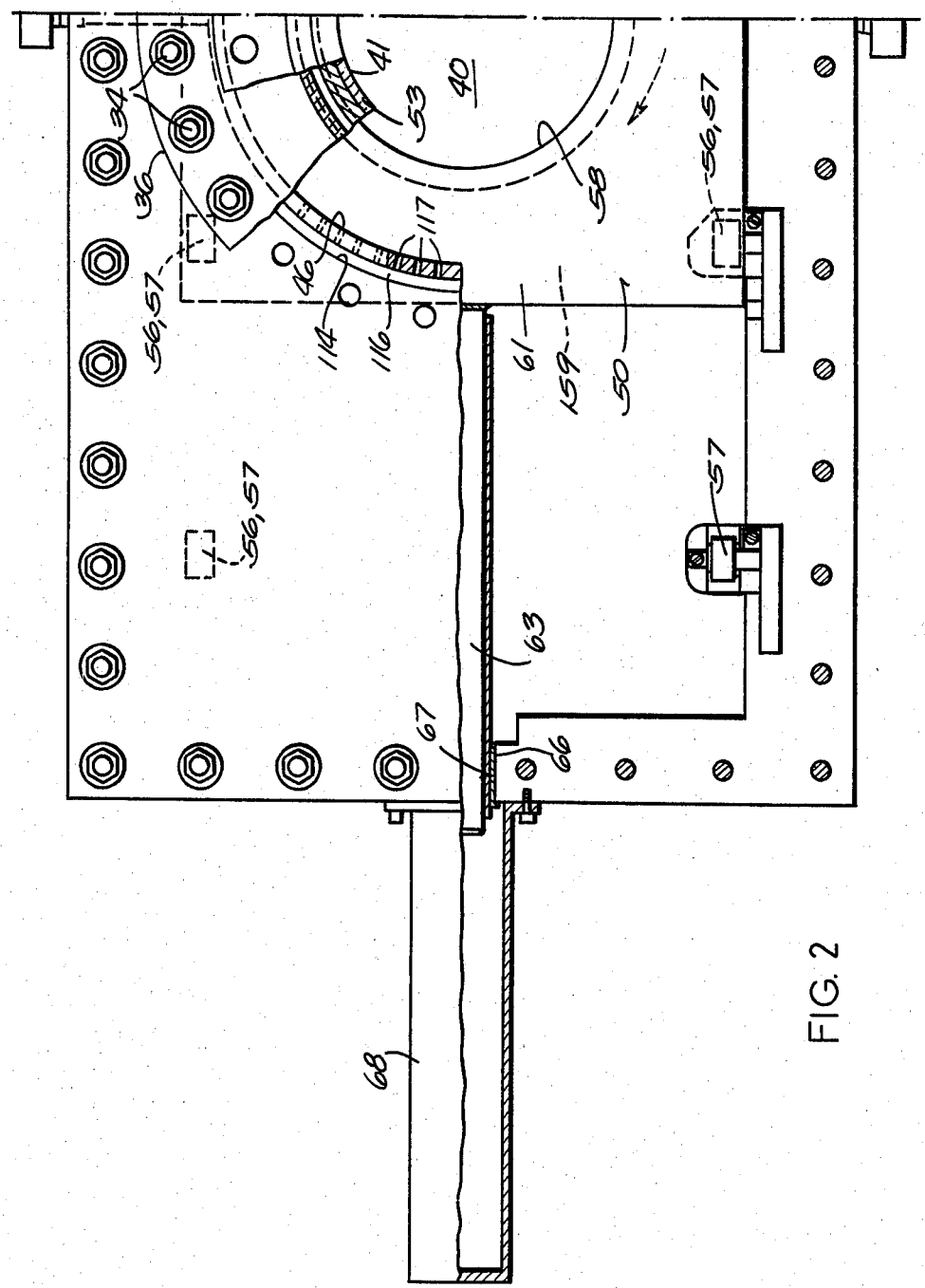
Figure 3:
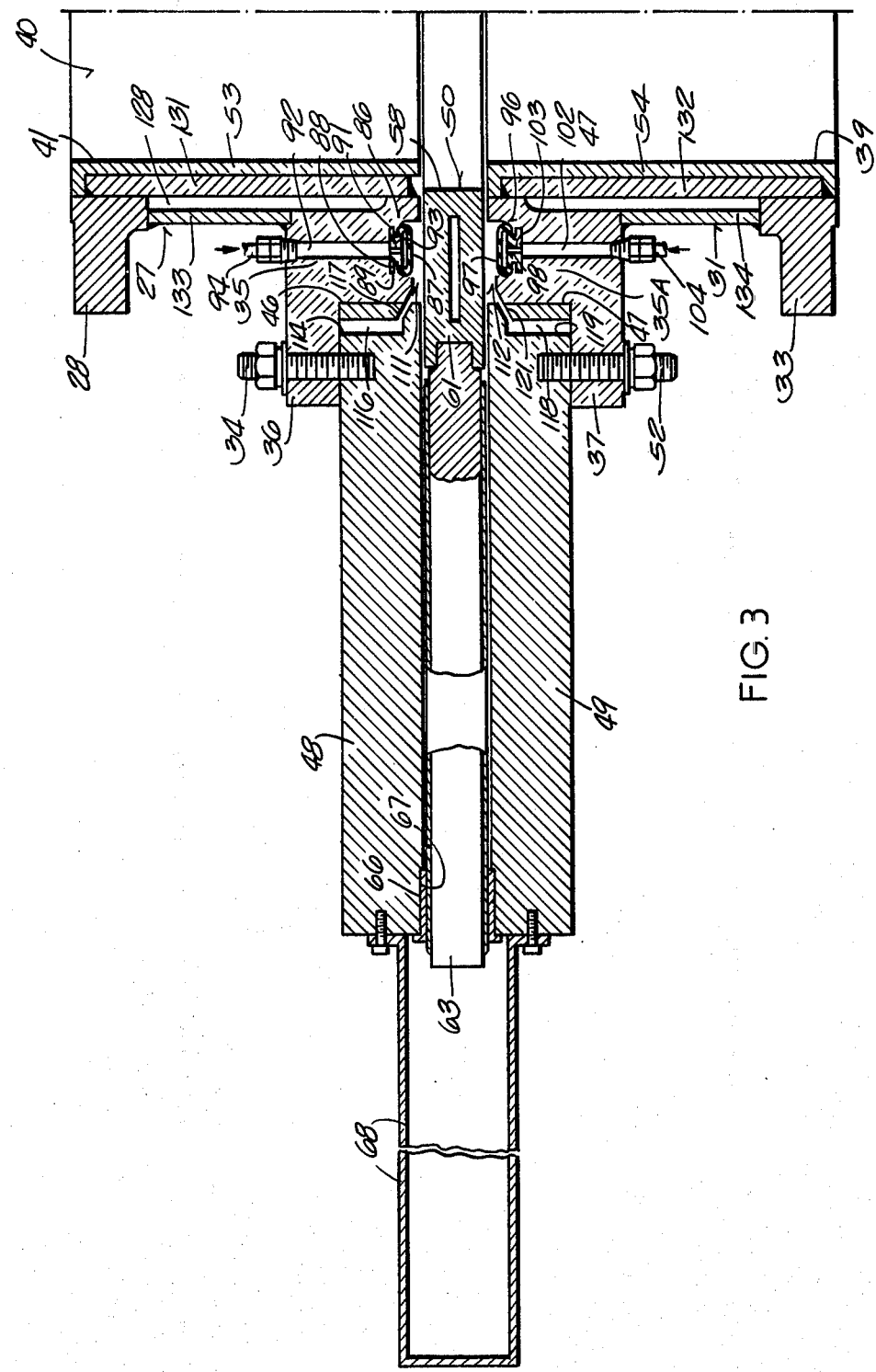
FIGS. 3 and 3A taken together is a view in vertical section taken through the valve shown in FIGS. 2 and 2A.
Figure 3A:
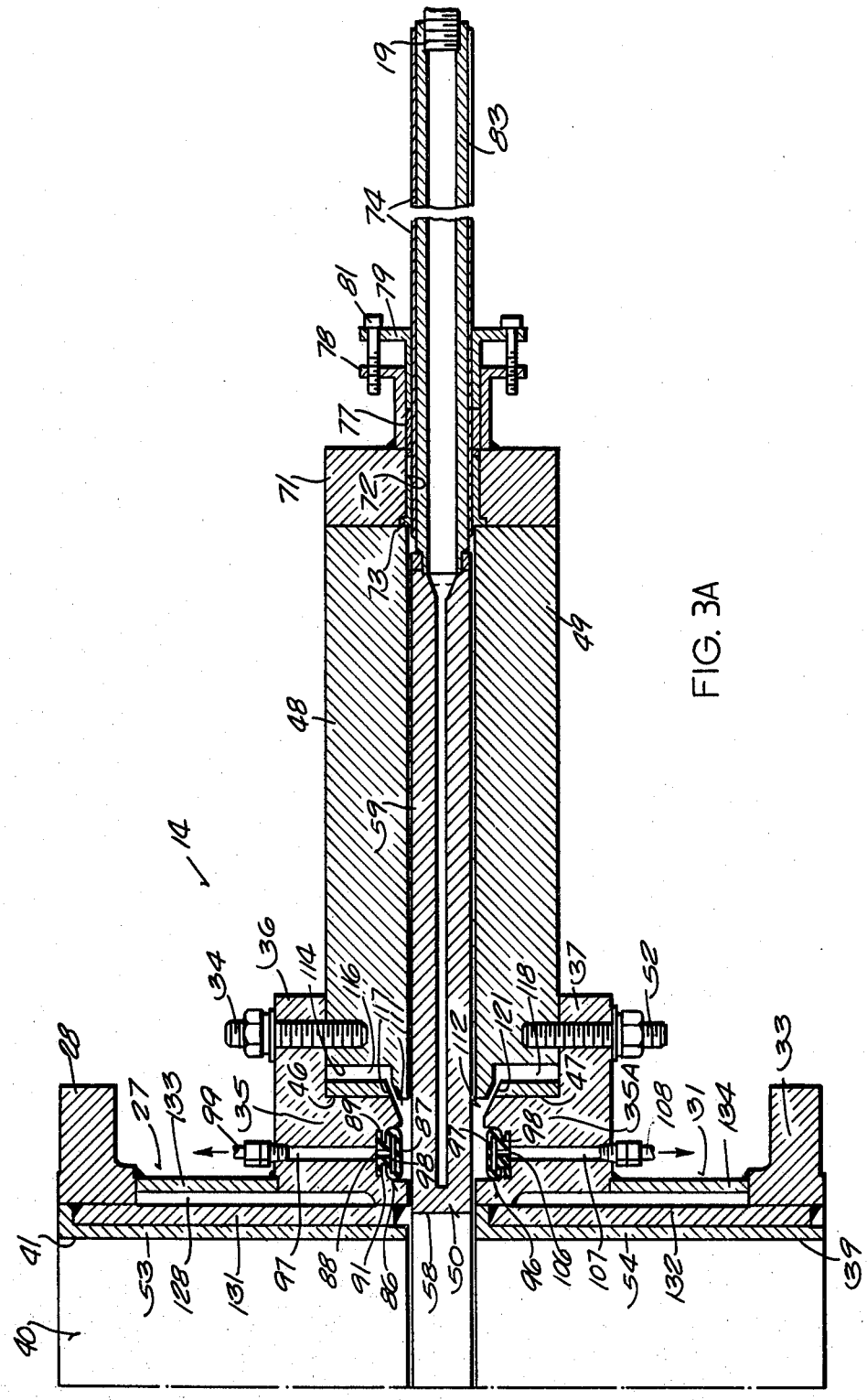
Figure 5:
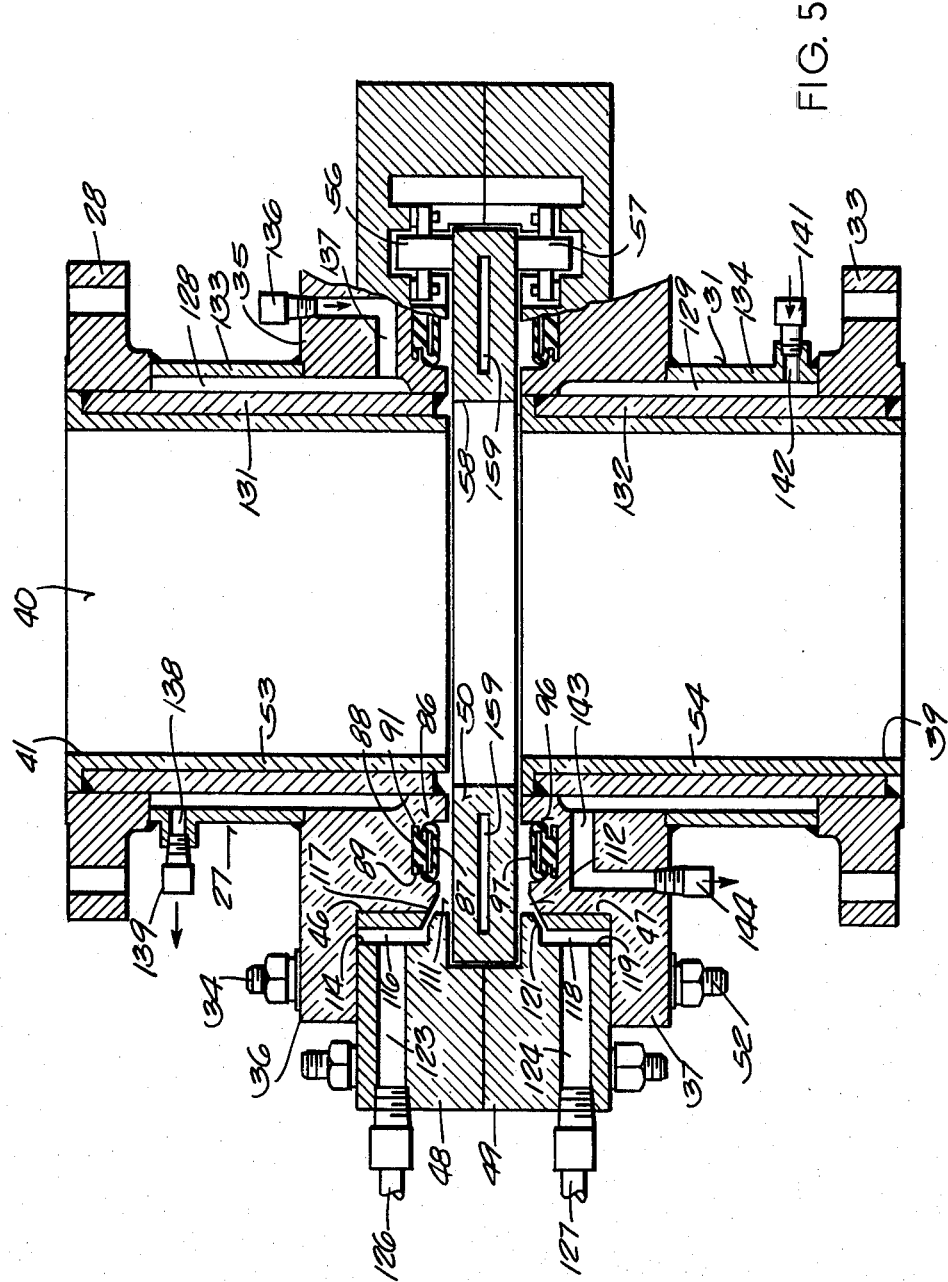
FIG. 5 is a view in transverse section in a plane represented by the line V—V in FIG. 2A, with parts broken away to show a set of supporting roller sets.

The slide gate 50 moves longitudinally across in a plane normal to the axis of the valve flow through opening 40 and is supported between a plurality of sets of upper and lower support rollers 56 and 57, FIGS. 2 and 2A, and 5. The slide gate 50 is in the form of a plate having an opening 58 therein. With the slide gate in an open position, as depicted in FIGS. 3 and 3A, and 5, the opening 58 is of a size to conform to the flow through opening 40 and sufficiently large enough in diameter so as not to interfere with the flow of material therethrough. As shown, the slide gate 50 has a solid portion 59 which, as viewed in FIGS. 3 and 3A, is to the right of the opening 58. Thus, when the slide gate 50 is moved leftward from the position it occupies, as depicted in FIGS. 3 and 3A, the solid portion 59 is moved across the valve flow through opening 40 to block the opening. As previously mentioned, the slide gate 50 is supported between a plurality of upper rollers 56 and a plurality of lower rollers 57. The rollers 56 and 57 not only support the slide gate 50 during a closing or opening movement, but also provide a resistive support against a downwardly acting load applied against the slide gate in closed position due to excess of gas pressure in the surge hopper 11 over that in the lock hopper 16 (or a differential gas pressure across the gate) and the weight of the material above the gate. With the surge hopper 11 empty and the slide gate 50 closed and the lock hopper 16 pressurized, an upwardly acting force will be applied to the slide gate from the bottom thereof due to an excess of gas pressure in the lock hopper 16 over that in the surge hopper 11. This upwardly acting force on the slide gate 50 will be counteracted by the upper rollers 56.

To support the slide gate 50 in its movement the portion 61 of the slide gate to the left of the opening 58, as viewed in FIGS. 3 and 3A, extends a distance leftwardly from the opening 58 and serves as a pilot. A guide bar or rod 63 is secured to the end surface of the pilot 61 by welding and extends leftwardly through a guide bushing and seal 66 that is disposed within a suitable opening 67 formed in the ends of the mating upper and lower plates 48 and 49. Thus, the slide gate 50 is guided in a straight line path of travel in a closing movement by the guide bar of rod 63 and is also supported during its straight line closing movement by the plurality of roller sets 56, 57. A protecting cover or cage 68 is provided for the extended end of the guide rod 63 when the slide gate 50 is moved to its closed position. The cover also serves the function of a gas pressure seal.

At the opposite or right-hand end of the valve 14, as viewed in FIGS. 2 and 2A, 3 and 3A, the upper and lower plate members 48 and 49 are sealed by an end plate 71 which is screw fastened to the ends of the plate members. As shown, the end plate 71 is provided with an opening 72 the axis of which coincides with the longitudinal axis of the slide gate. The opening 72 is adapted to receive a bearing seal 73 in which one end of a tubular guide support tube 74 is disposed. At the external surface of the end plate 71 and surrounding the guide support tube 74 is a seal 77. The seal 77 is located within a flanged retainer bracket 78 which is axially centered with respect to opening 72 and welded in operative position to the end plate 71. A flanged seal retainer 79 mounted on the guide tube 74 and is adapted to fit within the retainer bracket 78 and is disposed to abut the seal 77 to retain it in operative position. A plurality of screws 81 extended through the radial flange of the seal retainer 79 into threaded engagement with suitably aligned threaded openings formed in the flange of the retainer bracket 78.

As shown, with the guide support tube 74 there is a hollow slide gate actuating rod 83 which extends inwardly into the valve housing. The inner end of the rod 83 is provided with a flanged coupling 84 through which a plurality of screws 86, one of which is shown, extend into threaded engagement with the adjacent end of the slide gate 50. The linear-actuator 18, shown in FIG. 1, has its extending rod 19 connected to the end of the actuating rod 83. Thus, operation of the linear-actuator 18 in a first direction will effect a leftward closing movement of the slide gate 50 moving the slide gate opening 58 out of alignment with the flow through opening 40 of the valve. Operation of the linear-actuator 18 in the opposite direction will cause the slide gate 50 to be moved to resposition its opening 58 into registration with the openings of the valve body portions, thus completing the flow through opening 40.

To effect a gas-tight seal between the slide gate 50 and the opening 41 in the upper valve body portions 27, there is provided an inflatable seal member 86. As shown, the seal member 86 has an inflatable tube-like portion 87. For maintaining the seal 86 in operative position, the inflatable tube portion 87 is provided with a circular flanged mounting portion 88 which in cross-section presents a T-shaped configuration. The laterally extending arms of the mounting portion 88 are confined within circular grooves or slots 89 and 91 formed in the upper-inner-end body portion 35. A fluid (gas or liquid) is utilized to inflate the seal and is provided through a drilled passage 92 formed in the body portion 35. The drilled passage 92 communicates with a fluid passage 93 integrally formed in the mounting portion 88 of the seal and communicating with the interior of the inflatable tube portion 87. Flexible supply line 94 is connected to the outer end of the drilled passage 92 and serves to connect the inflatable seal 87 to a source of pressure fluid (not shown). With the slide gate 50 in closed position, the seal is inflated and operates to prevent gas transfer between the upper and lower body portion openings 41 and 39, respectively. A fluid discharge outlet is also provided for the seal 86 and comprises a drilled passage 97 that is in communication with the interior of the seal 86 via a passage 98 formed through the mounting portion 88. A flexible hose 99 is connected to the outer-end of the passage 97 and directs the discharge to a sump (not shown). Provision of separate inlet 92 and outlet 97 for the inflating fluid, makes it possible to circulate the inflating fluid through the body of the inflatable seal 86, while simultaneously maininting the seal in an inflated condition, thereby achieving cooling of the elastomeric material of which the seal 86 is constructed.

An inflatable seal 96 which is similar to the inflatable seal 87 is also provided for sealing the bottom surface of the slide gate 50. The seal 96 has an inflatable tube-like portion 97 and a circular flange mounting portion 98 which in cross-section presents a T-shaped configuration. The laterally extending arms of the mounting portion 98 are confined within circular grooves or slots formed in the body portion 36 of the lower valve body portion 31. A fluid (gas or liquid) is utilized to inflate the seal and is provided through drilled passages 102 formed in the body portion 35A of the lower valve body portion 31. The drilled passage 102 has communication with fluid passages 103 formed in the mounting portion 98 of the seal 96 and which communicate with the interior of the inflatable tube portion 97. A flexible fluid supply line 104 is connected to the external outer ends of the drill passage 102 and serves to connect the inflatable seal to a source of pressure fluid (not shown). It will be apparent that both of the inflatable seals 86 and 96 can be connected to source of pressure fluid in a manner so that both are inflated simultaneously or selectively as desired. Discharge of fluid from the inflatable tube portion 97 is accomplished through a passage 106 in the mounting portion 98 of the seal which is in communication with a drilled passage 107 in the body portion 35A. A flexible hose 108 is connected to the outer end of passage 107 and directs the discharge to a sump (not shown). Provision of separate inlet 102 and outlet 107, makes it possible to circulate the inflating fluid through the body of the inflatable seal 96, while simultaneously maintaining the seal in an inflated condition, thereby achieving cooling of the elastomeric material of which the seal 96 is constructed.

The advantages obtained from the double inflatable seal arrangement are two-fold. First, the slide gate 50 physically occupies the major openings in the valve, in either its open or closed positions, thereby substantially eliminating the possibility of large pieces of solids, greater than 1/16 of an inch in size, from entering into the spaces which are unavoidably present and clogging the operating portions of the valve; and, second, it provides the ability to prevent solid fines that do migrate into the cylindrical opening below the slide gate, from a deeper penetration into the interior of the valve, thereby reducing the likelihood of failure of the valve from the effects of solid fines.

Even though the double inflatable seals 86 and 96 operate to prevent a major portion of solid fines from entering into the openings within the valve, in the environment in which the valve is to be utilized there are abrasive particles of char or product dust which can accumulate on the slide gate and which will interfere with the sealing effect of the inflatable seals 86 and 96 and that will also cause premature seal failure. To eliminate the accumulation of dust particles from accumulating on the surfaces of the slide gate 50 prior to the seals 86 and 96 being inflated, there are provided purging systems 111 and 112. As shown in FIGS. 3 and 3A, the upper housing or plate member 48 is provided with a bore 114 which receives the circular, inner-end portion 35 of the upper-valve body portion 27. The diameter of the bore 114 is larger than the diameter of the portion 35. The arrangement is such that the two elements cooperate to define a circular pressure chamber 116. A plurality of spaced apart radially disposed angularly inclined drilled passages 117 are provided from the pressure chamber 116 so as to communicate with the surface of the slide gate 50 at a position outside of the inflatable seal 86. The location of the drill passages 117 are such that a pressure fluid, such as an inert gas, within the chamber 116 will impinge upon the slide gate surface at a position immediately outwardly of the inflatable valve 86. In this manner the pressure fluid will forcefully blow any accumulated dust particles from the top surface of the slide gate in the area on which the inflatable seal 86 is to engage with. Thus, the purging of the slide gate surface will provide a clean surface area thereby ensuring a good sealing contact of the seal 86 and will also prevent abrasive particles from causing premature failure of the seal.

The purging system 112 is similar to the system 111 and includes a fluid chamber 118. The chamber is defined by the wall of a bore 119 formed in the lower housing or plate member 49 and the peripheral surface of the valve body portion 31. A plurality of equally spaced-apart, angularly-inclined, radial-drilled passages 121 are provided. The passages 121 being constructed so as to provide communication between the chamber 118 and an area above the inflatable seal 96. Thus, the purging system 112 will operate to clean the undersurface of the slide gate to provide a clean sealing surface for the inflatable seal and also to prevent abrasion to the seal.

Fluid under pressure, such as an inert gas, is supplied to the chambers 116 and 118 by means of horizontal passages 123 and 124 drilled through the housings 48 and 49, respectively. The passages 123 and 124 are connected to a source of fluid under pressure by flexible supply lines 126 and 127. The supply lines 126 and 127 may be connected to a single source of fluid pressure or may be selectively connected thereto as desired. It is here preferred that the chambers 116 and 118 be individually supplied with pressure fluid.

When the chambers are provided with fluid under pressure, the fluid will be directed to the areas between the inflatable seals and the slide gate surfaces. The fluid expelled from the jet like radially disposed passages 117 and 121 will blast the surface areas and crevises of the valve, purging solid particles of char or coal fines therefrom.

In operation to close the valve 14, both of the inflatable seals 86 and 96 will be depressurized. Thereafter both of the purging systems 111 and 112 will be activated to blast the surfaces of the slide gate and crevise adjacent to the seals to remove fines. Thereafter the linear-actuator 18 is actuated to move the slide gate 50 leftwardly, as viewed in FIGS. 3 and 3A, moving the opening 58 in the slide gate out of registery with the valve body openings. This movement is sufficiently far enough so as to bring a solid surface of the slide gate to the right of the opening 58 into position to close the flow through opening 40. With the slide gate 50 in a closed position the purging systems are de-activated, the inflatable seals 86 and 96 are both pressurized to effect gas-pressure-tight closure of the valve.

Opening of the valve requires that both of the inflatable seals 86 and 96 be depressurized. The purging systems 111 and 112 are then activated to continuously clear out fines from the cavities. The slide gate 50 is then moved rightwardly to align the opening 58 therein with the openings 41 and 39 of the upper and lower valve body portions. The purging systems are maintained active during slide gate movement. With the slide gate 50 in full open position the inflatable seals are pressurized and thereafter the purging systems deactivated. The pressurizing of the inflatable seals 86 and 96 with the slide gate in open position prevents the entry of fines into the slide gate cavities.

It is contemplated that the valve 14 will be utilized for service in which the char that will be handled is extremely hot. Heat transferred from the hot char to the valve body could reduce the structural strength of the valve, distorting it and impairing its useful service life. To overcome the influence of heat transfer, the valve body portion 27 and 31, the upper and lower housing or plates 48 and 49 and the slide gates 50 are provided with water cooling passages. As shown in FIGS. 3 and 3A and FIG. 5, the upper and lower valve body portions 27 and 31 are provided with circular water chambers 128 and 129, respectively. These chambers are defined by the inner steel wall cylinders 131 and 132 of the valve portions 27 and 31, respectively, against which the wear liners 53 and 54 abut and the outer cylindrical walls 133 and 134 of the valve body portions 27 and 31, respectively. Cooling water is circulated through the chambers 128 via an inlet connection 136 which communicates with a passage 137 formed in the inner end portion 35 of the valve body portion 27 and which communicates with the chamber 128. The cooling water entering the chamber 128 flows out through a passage 138 and a fitting 139 constructed in the outer cylindrical wall structure 133 of the valve body portion 35. In a similar manner, cooling water is circulated through the chamber 129 of the lower valve body portion 31 via a fitting 141 and communicating passage 142. The cooling water flows out of the chamber 129 through a communicating passage 143 and a connected fitting 144. It will be appreciated that the water inlet fittings 136 and 141 are connected to a suitable source of cooling water (not shown) in a well-known manner; also the outlet fittings 139 and 144 are connected in a well-known manner to a sump (not shown). Thus, a continuous supply of cooling water will flow around both of the valve body portions 27 and 31.

Figure 4:
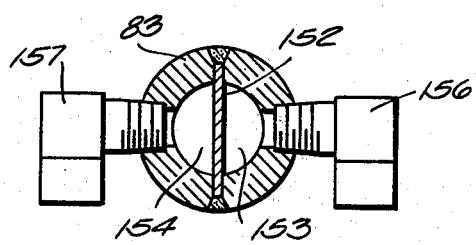
FIG. 4 is a view in transverse section through the slide gate actuating rod taken in a plane represented by the line IV—IV in FIG. 2A.

The slide gate 50 is also cooled by a flow of colling water. To this end the slide gate 50 is provided with a hollow core 147 in which a plurality of dividers or barriers 148A through 148E have been formed. The barriers 148 are equally spaced across the slide gate core, as seen in FIG. 2A, and extend longitudinally parallel to the longitudinal axis of the slide gate. The center barrier 148A extends from the collar portion 149, that is formed when providing the core 147 and which defines the opening 58 in the slide gate; to a position adjacent to the inner end of the hollow actuating rod 83. The end of the center barrier 148A has a vertical slot 151 which receives the protruding end of a rod barrier 152. The rod barrier 152, as shown in FIGS. 2A and 4, is formed as an integral part of the rod 83 by splitting the rod 83 longitudinally and welding the two-half portions to a plate which is defined herein as the barrier 152. The barrier 152 serves to define two longitudinally extending flow passages in the rod the passage 153 serving as cooling water inlet passage and the passage 154 serving as a discharge water passage. Cooling water from a source (not shown) is admitted to the passage 153 via a fitting 156 which is tapped into the rod 83 at the end thereof adjacent to the servo motor rod 19. Water is discharged from the passage 154 via a fitting 157 likewise tapped into the rod 83. It will be understood that both of the fittings 156 and 157 receive flexible conduit to permit unrestricted longitudinal movement of the rod 83 in effecting a closing or opening positioning movement of the slide gate 50.

The end of the slide gate 50 adjacent to the end of the barrier 148A is provided with an opening 158 through which the rod end of the rod 83 extends. As shown, the portion of the surface of the opening 158 is flared to provide for an easier flow of the cooling water into and out of the core of the slide gate. The cooling water flowing into the core 147 of the slide gate 50 is channeled via the barrier 148A and the barrier 148B toward the collar 149. The cooling water is then directed to make 180° turn being channeled rearwardly around the stub end of the barrier 148B and thence made to flow between the barriers 148B and 148C. The cooling water flowing toward the right end of the core will flow around the stubbed end of the barrier 148C and thence will flow between the barrier 148C and the wall surface of the slide gate. The cooling water will flow around the collar 149 in the unrestricted portion 159 of the core 147. The water flowing around the collar will flow through the channels defined by the interior surface of the slide gate and the barrier 148E, the barriers 148E and 148D and the barrier 148D and 148A, eventually discharging out through the passage 154 in the rod and the fitting 157 to return to the sump (not shown).

From the foregoing detailed description, it should be apparent that a novel and improved valve has been provided that is particularly well suited for the handling of a mixture of solids and gases or a mixture of solids in water. It is also apparent that the valve is suitable for handling hot material, the temperature of which is above 500° F.

The embodiments of the invention in which an exclusive property or privilege is claimed are defined as follows:

1. A valve,
   a first plate member having an opening therein;
   a second plate member having an opening therein, said first and second plate members cooperating to define a space therebetween and having their openings in axial alignment;
   a slide gate having an opening therein movably supported with the space defined by said first and second plate members, said slide gate being selectively positionable within the space defined by said cooperating plate members in a manner to have its opening positioned in axial alignment with the openings in said first and second plate members, or into a position wherein a solid surface portion of said slide gate interrupts the communication between the axial aligned openings in said first and second plate members;
   a first valve body portion having an axial opening, said first valve body portion having one end thereof secured in the opening in said first plate member in a manner to have the axis of its opening coincide with the axis of the opening in said first valve plate;
   a second valve body portion having an axial opening, said second valve body portion having one end thereof secured within the opening in said second plate member in a manner to have the axis of its opening coincide with the axis of the opening in said second plate member to thereby establish a flow through opening in the valve wherein the engagements of said first and second valve body portions in the openings in said first and second plate members cooperate to define first and second circular chambers;
   a plurality of radially extending, spaced-apart passages formed in said first plate member constructed and arranged so as to communicate with said first circular chamber and an area at one side of said slide gate around the said flow through opening;
   a plurality of radially extending passages formed in said second plate member constructed and arranged so as to communicate with said second circular chamber and an area at the other side of said slide gate around said flow through opening;
   means operably connected to selectively supply a fluid under pressure to said first and second chambers,
   whereby the area around said flow through opening may be purged of particle fines as desired regardless of said slide gate position to ensure a clear slide gate surface for the engagement of said inflatable seals;
   a first inflatable seal carried by said first valve body portion in a position surrounding the axial opening therein and to be engageable with the adjacent surface of said slide gate;
   a second inflatable seal carried by said second valve body portion in a position surrounding the axial opening therein and to be engageable with the adjacent surface of said slide gate;
   pressure fluid supply means operably connected to supply a fluid under pressure to said first and second inflatable seals to effect their engagement with the adjacent surface of said slide gate to effect a gas tight seal therebetween; and,
   actuating means operably connected to effect a selective positioning movement of said slide gate.

2. A valve according to claim 1 wherein said actuating means operably connected to effect a selective positioning movement of said slide gate includes an actuating rod movably supported by said first and second plate members, said actuating rod having one end thereof extending through an opening formed in said first and second plate members into connected engagement with said slide gate, said actuating rod having its opposite end extending outwardly of said first and second gate members, said actuating rod being hollow and having a longitudinally extending barrier therein defining a cooling water inlet flow passage and a water discharge passage;
   a circular water cooling chamber in each of said valve body portions;
   means operably connected to circulate cooling water through said cooling chambers in said first and second valve body portions;
   a cooling water chamber in said slide gate provided with a plurality of flow channels defining a labyrinth which has communication with the passageways in said actuating rod wherein the cooling water passing through the inlet passage of said actuating rod flows into the cooling water chamber in said slide gate and is directed in a flow pattern around said labyrinth and is discharged into the discharge water passage in said actuating rod;
   means to circulate cooling water through said inlet passage in said actuating rod and into said cooling chamber in said slide gate and to receive the discharge of water from said slide gate cooling water chamber through said water discharge passage in said actuating rod; and,
   a linear-actuator connected to the outwardly extending end of said actuating rod to effect its axial movement in a selected direction.

3. A valve according to claim 2 including a plurality of sets of support rollers on which said slide gate is supportably movable, said sets of support rollers being carried by said first and second plate members in spaced apart relationship to permit the movement of said slide gate therebetween, said support rollers being operable to provide a resistive support against an upwardly or downwardly acting load applied against said slide gate in closed position due to a differential gas pressure across said gate.

* * * * *